United States Patent
Iannelli et al.

(10) Patent No.: US 6,392,779 B1
(45) Date of Patent: May 21, 2002

(54) COMPOSITE SECOND-ORDER BIAS CONTROL SCHEMES

(75) Inventors: John Iannelli, Pasadena; Henry A. Blauvelt, San Marino, both of CA (US)

(73) Assignee: Agere Systems Guardian Corp., Allentown, PA (US)

( * ) Notice: Subject to any disclaimer, the term of this patent is extended or adjusted under 35 U.S.C. 154(b) by 0 days.

(21) Appl. No.: 09/655,227

(22) Filed: Sep. 5, 2000

Related U.S. Application Data

(60) Provisional application No. 60/152,494, filed on Sep. 2, 1999.

(51) Int. Cl.$^7$ .............................. G02F 1/03; G02F 1/00; G02F 1/01
(52) U.S. Cl. ..................... 359/245; 359/237; 359/239
(58) Field of Search ................................ 359/245, 237, 359/239, 181, 187, 249, 238, 276, 279; 385/2, 3; 372/12, 26

(56) References Cited

U.S. PATENT DOCUMENTS

| | | | |
|---|---|---|---|
| 3,875,400 A | * 4/1975 | Pao | 359/102 |
| 5,003,624 A | * 3/1991 | Terback | 359/181 |
| 5,105,380 A | * 4/1992 | Owechko | 708/819 |
| 5,343,324 A | * 8/1994 | Le | 359/184 |
| 6,046,838 A | * 4/2000 | Kou | 359/245 |

* cited by examiner

Primary Examiner—Georgia Epps
Assistant Examiner—Gary O'Neill
(74) Attorney, Agent, or Firm—Christie, Parker & Hale, LLP

(57) ABSTRACT

A bias control system is adapted to reduce composite second order distortions in an electro-optic modulator. The bias control system includes a pilot tone generator that generates a first pilot tone at a first frequency and a second pilot tone at a second frequency. The first and second tones are swept in frequency over a predetermined frequency range with a predetermined sweep rate, to spectrally spread third order distortion products over a larger frequency band, allowing the amplitude of the pilot tones to be increased, thereby increasing the gain of the bias control circuit. The bias control system further includes an optical detector for sampling the output of the electro-optic modulator, wherein the sampled optical output includes a distortion product resulting from the first and second pilot tones, and a feedback control circuit coupled to the optical detector and to the pilot tone generator for generating an error signal based on the distortion product in the sampled optical output for controlling the bias point of the electro-optic modulator. The bias control system preferably holds the difference between the frequency of the first pilot tone and the frequency of the second pilot tone constant over the entire range of excursion frequencies to allow for the use of fixed frequency demodulators and filters.

10 Claims, 6 Drawing Sheets

COMPOSITE SECOND-ORDER BIAS CONTROL SCHEMES

CROSS-REFERENCE TO RELATED APPLICATION

This application claims the benefit of U.S. Provisional Patent Application No. 60/152,494, filed Sep. 2, 1999, the contents of which is incorporated herein by reference.

FIELD OF THE INVENTION

The present invention relates generally to optical fiber communications and more particularly to biasing control schemes for electro-optic modulators.

BACKGROUND

A typical optical communications system includes a transmitter, an optical channel (e.g., optical fiber), and a receiver. Within the transmitter, an electro-optic modulator is often used to modulate an optical carrier with the information to be transmitted. The modulated carrier is transmitted across the optical channel to the receiver, which retrieves the information from the carrier.

External modulators are commonly used in a variety of 1310 nm and 1550 nm networks to modulate the optical carrier with an information signal. Advantageously, external modulators provide essentially pure amplitude modulation with little or substantially no frequency chirp. However common external modulators are often inherently non-linear devices. As a result, external modulators are often operated in a mode which minimizes the non-linear effects of their transfer function, such as second and higher order harmonics. Typically a bias signal is applied to the electro-optic external modulator to establish an operating point, or bias point, to maintain linear operation of the modulator.

Recent advancements in modulator technology have resulted in modulators whose performance is relatively constant over time. However, the bias point of a typical external modulator may vary due to temperature variations, signal fluctuations, manufacturing tolerances, optical reflections and other environmental factors. If the proper bias point is not maintained, the modulator will exhibit stronger non-linearity, including the generation of even-order harmonics and the reduction of the signal strength in one of the outputs. This, in turn, may decrease the maximum dynamic range of the optical communications link. Therefore, optical communication systems that utilize external modulators typically include a control loop to optimize the bias point of the modulator.

In one common approach to controlling the bias point of an external modulator, two pilot tones at different frequencies $f_1$ and $f_2$ are applied to the electro-optic modulator. If the modulator is not operating at its half-power point, the modulator produces at its output among other terms, a distortion product $f_d$ located at the sum frequency $(f_1+f_2)$ and difference frequency $(f_1-f_2)$ of the two pilot tones. The magnitude of the distortion product is indicative of the error between the desired DC bias signal value and the actual DC bias signal value. As an example, if the distortion product is equal to zero, the modulator is currently operating at its half-power point and therefore no bias error exists. However, if second-order harmonic energy is present, a bias error exists and the bias signal value is adjusted to null the bias error.

Even though the modulator is properly biased to eliminate even order distortions, it is likely that modulator performance will suffer from large odd order distortions. Since the pilot tones are typically not being corrected for odd order distortion products, for example through pre-distortion circuitry, odd order distortion products that fall within the frequency band of interest may occur. Third order distortion products typically will have a magnitude roughly equal to the magnitude of the pilot tones. A typical manifestation of third order distortion products appears as sidebands on each RF carrier. For example, referring to FIG. 1, for purposes of illustration assume an optical transmission system operates with one RF carrier, $f_1$=200 MHz, and two pilot tones, $f_a$=300 kHz and $f_b$=400 kHz. Third order distortion products may therefore be produced at frequencies equal to $f_1+f_a+f_b$ and $f_1-f_b$, corresponding to 200.7 MHz and 199.3 MHz, respectively in this example.

In practice the pilot tones may be introduced into the modulator by injection through a bias port or an RF input port. Several design issues are created when the pilot tones are combined with the RF carriers and injected into the RF port. First, pilot tones are often relatively low frequency signals. This is typically the case since higher frequency bands are frequently allocated for other applications (e.g., 5 MHz–42 MHz for analog return path applications). In addition, low frequency circuit components with acceptable linearity and noise performance are readily available.

The tolerance of the frequency response of the RF drive circuitry is typically on the order of about +/−0.75 dB for common optical communication systems. If the pilot tones are combined with the RF carriers the bandwidth of the frequency response of the RF drive circuitry may be greatly increased. A typical bandwidth may range from an upper end of the band (typically from 745 MHz to 1 GHz) down to the lower end of the band as defined by the pilot tone frequencies. Such wide bandwidth may result in a compromise in the RF design. In addition, to avoid the third order distortions described above, the predistortion circuitry must also operate down to the pilot tone frequencies. This can also impose constraints on the RF design.

When the pilot tones are applied to the modulator along with the DC bias through the bias port, the constraints on the frequency response and the pre-distortion mentioned above are removed. However, since the RF and the DC ports both operate on the same optical waveguides, the third order distortions shown in FIG. 1 may still occur. Third order distortions may be reduced by reducing the amplitude of the pilot tones. However, the amplitude of the pilot tones may not be reduced below the dynamic range of the detection electronics of the control loop. Conventionally, as the optimum half-power bias point is approached, the magnitude of the distortion product drops off relatively quickly making detection and processing of the distortion product difficult. In addition, typical transmitters often operate with the amplitude of the pilot tones very close to the signal to noise limits so that the pilot tones do not take away from the overall modulation depth of the modulator. Therefore, in many systems it may not be possible to substantially reduced the amplitude of the pilot tones to reduce third order distortion.

Another method to reduce third order distortion created when pilot tones are injected into the bias port of a modulator is to pulse the tones in the time domain and detect them synchronously with the control loop. However, burst mode synchronous control loops are difficult to design and operate.

Thus, there is a need for approaches to controlling the bias point of electro-optic modulators, such as Mach-Zehnder modulators, that does not introduce significant third order distortion products onto the transmitted optical signal.

SUMMARY OF THE INVENTION

In one aspect of the present invention, a bias control system for automatically controlling a bias point of an electro-optic modulator includes a pilot tone generator that generates a first pilot tone at a first frequency and a second pilot tone at a second frequency. The first and second tones are swept in frequency over a predetermined frequency range with a predetermined sweep rate, to spectrally spread third order distortion products over a larger frequency band, allowing the amplitude of the pilot tones to be increased and thereby increasing the gain of the bias control circuit.

The bias control system preferably further includes an optical detector for sampling the output of the electro-optic modulator, wherein the sampled optical output includes a distortion product resulting from the first and second pilot tones, and a feedback control circuit coupled to the optical detector and to the pilot tone generator for generating an error signal based on the distortion product in the sampled optical output for controlling the bias point of the modulator.

In another aspect of the invention, the difference between the frequency of the first pilot tone and the frequency of the second pilot tone is held constant over the entire range of excursion frequencies.

In an alternate embodiment, a method of automatically controlling a bias point of an electro-optic modulator includes generating a first pilot tone at a first frequency, generating a second pilot tone at a second frequency, sweeping the frequency of the first and second pilot tones over a predetermined frequency range at a predetermined sweep rate, detecting a distortion product in output of the modulator resulting from the first and second pilot tones, and generating an error signal as a function of the distortion product for controlling bias point of the modulator.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

In an exemplary embodiment of the present invention, a feedback bias control system is employed to substantially reduce the non-linear effects of external optical modulators. In order to appreciate the advantages of the present invention, it will be beneficial to describe the invention in the context of an exemplary optical communication system.

Figure 1:
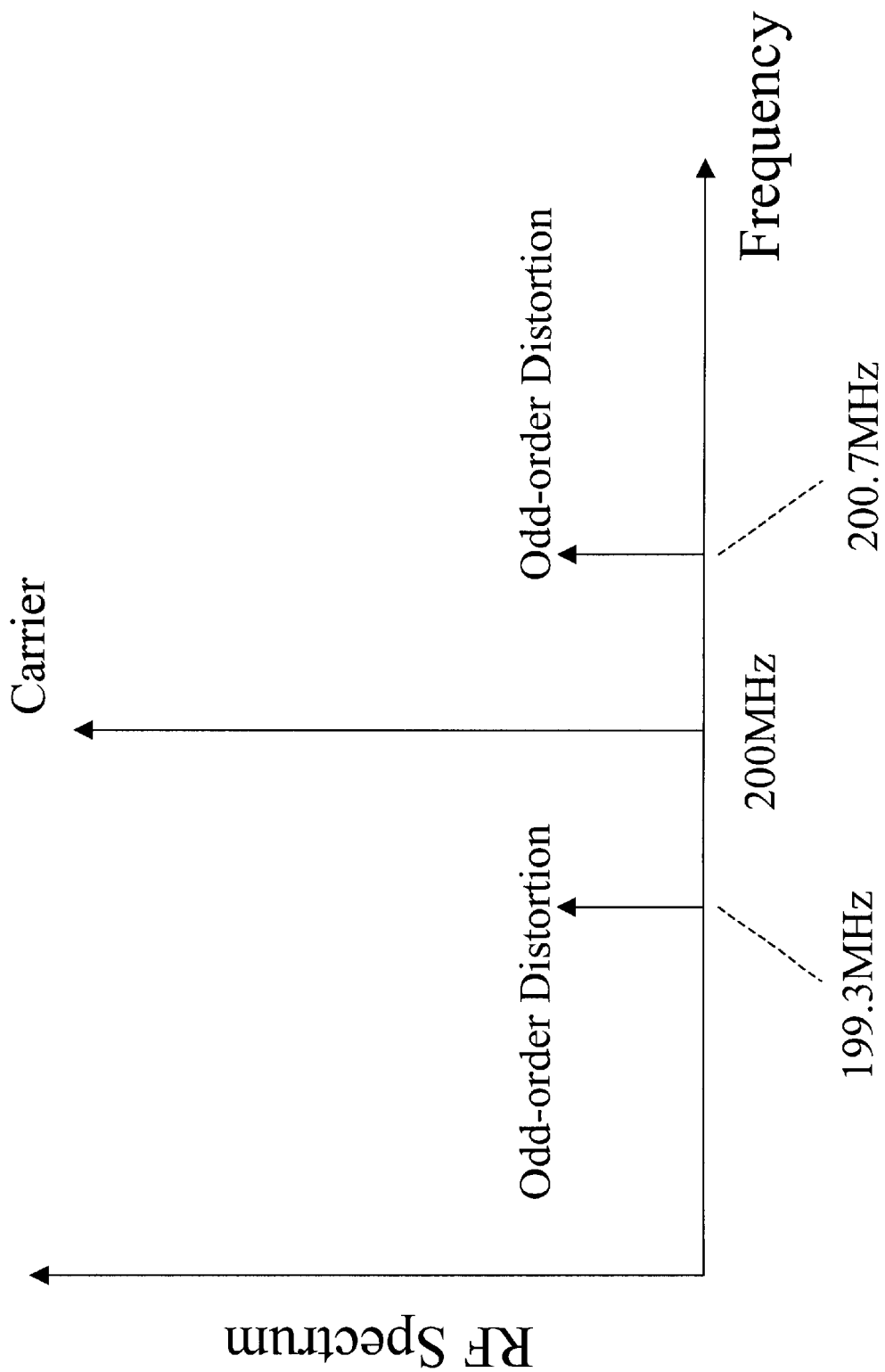
FIG. 1 is a graphical illustration of the frequency spectrum of an electro-optic modulator having third order distortion products in the sidebands of an RF carrier.
Figure 2:
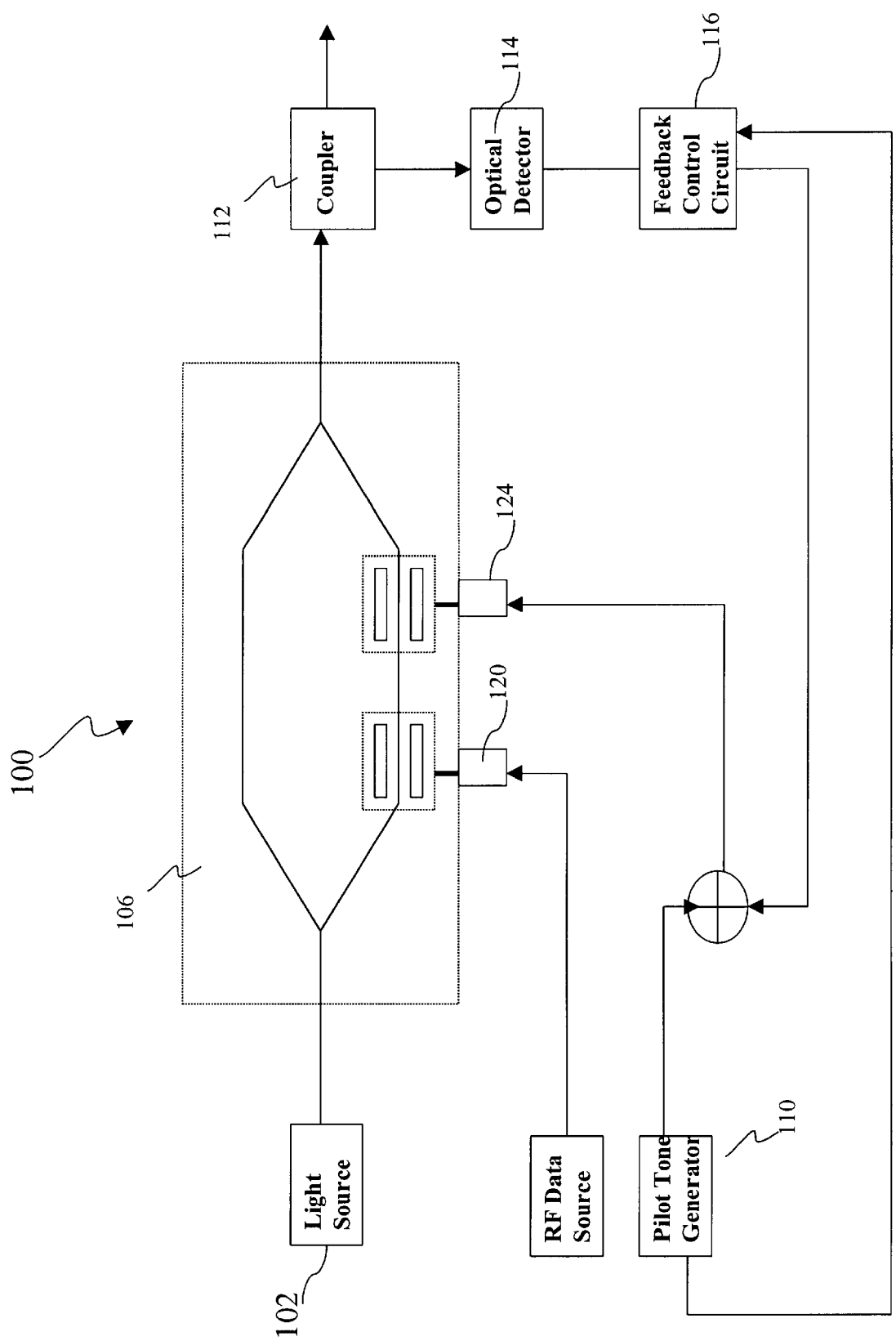
FIG. 2 is a simplified block diagram of optical transmission system having an external modulator and a pilot tone generator in accordance with an exemplary embodiment of the present invention.

FIG. 2 illustrates a functional block diagram of a representative optical communication system 100 employing an external electro-optic modulator 106. The system includes a light source 102 (such as for example, a laser or laser diode) which provides an optical signal to the electro-optic modulator 106 via a suitable transmission media such as a fiber or waveguide 108. In the described exemplary embodiment, the electro-optic modulator 106 may be a Mach-Zehnder modulator. Optical fiber 108 preferably maintains the polarization of the output signal of the light source to couple to the correct electromagnetic mode of the Mach-Zehnder modulator waveguide. The system 100 may further include a pilot tone generator 110, a coupler 112, an optical detector 114 and a feedback bias controller 116.

Figure 3:
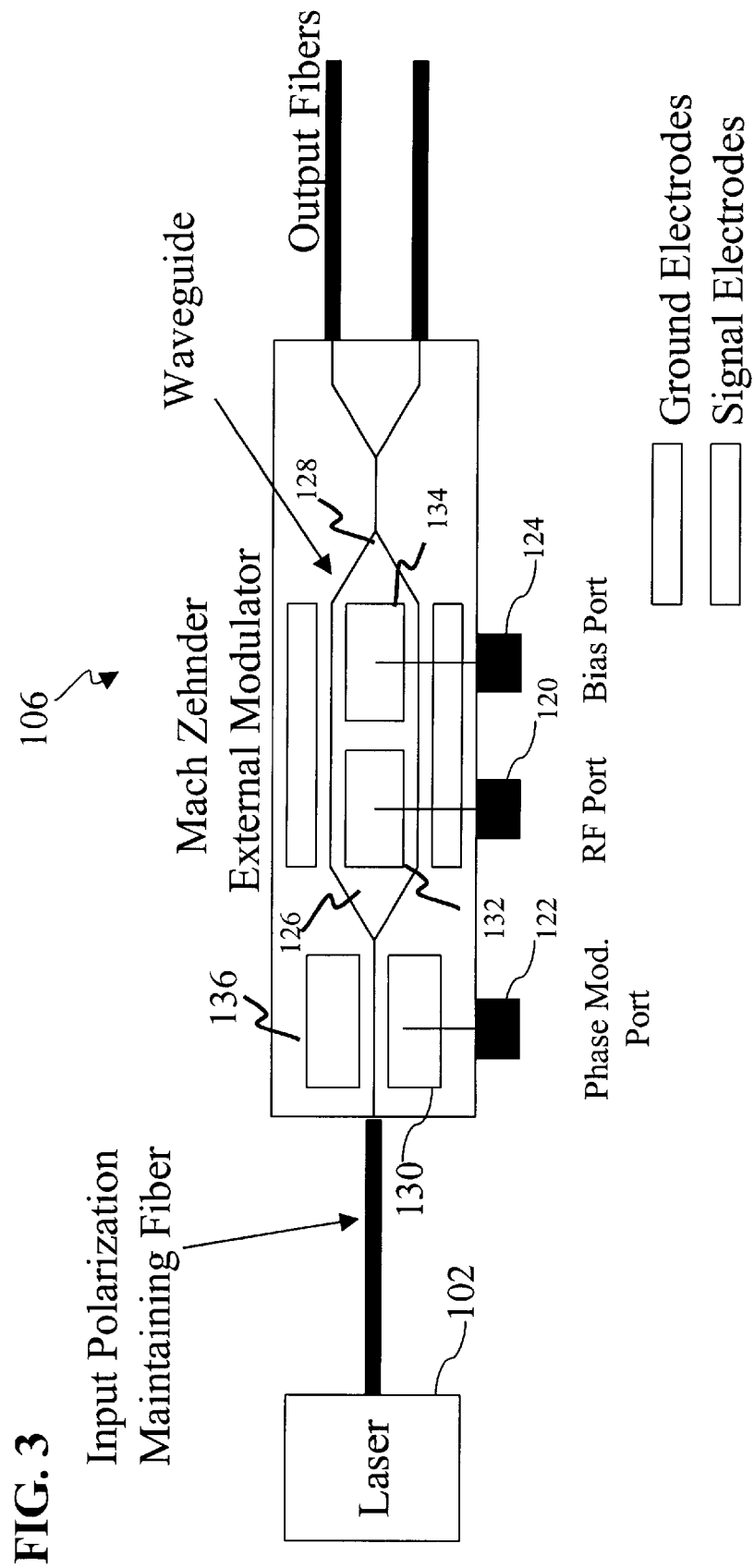
FIG. 3 is a simplified diagram of Mach-Zehnder modulator in accordance with an exemplary embodiment of the present invention.

Referring to FIG. 3, Mach-Zehnder modulators are commonly used in optical communication systems. Mach-Zehnder modulators operate on the principle of phase interferometry and, when linearized through either electronic or optical methods, offer superior linearity performance over other available external modulators. The more linear performance of the Mach-Zehnder modulator is especially advantageous for longer fiber spans (>40 km). The RF input port 120 of the modulator receives an electrical data carrying input signal which modulates the light wave within the modulator to transfer the data content in the electrical signal to the lightwave.

The electro-optic modulator 106 further includes a phase modulation port 122 and a DC electrical bias input port 124 that are used to provide direct phase modulation for overcoming certain nonlinear fiber optic effects and to control the operating point of the modulator respectively. Mach Zehnder modulators typically comprise a lithium niobate ($LiNbO_3$) or lithium tantalate ($LiTaO_3$) waveguide formed on a major surface. In the Mach-Zehnder, the optical input signal is split at a Y-junction 126 in the waveguide into two equal components. "Mach-Zehnder" typically refers to the waveguide Y-junctions and arms, along with the modulators. Each component travels in a corresponding arm of the waveguide before being recombined at a second Y-junction 128.

Electrically conductive signal electrodes 130, 132 and 134 as well as a plurality of ground electrodes 136 are formed on the waveguide surface of a Mach-Zehnder modulator in the vicinity of the waveguide arms. In operation, a time varying voltage applied to the electrodes produces an electric field in the IO device substrate which changes the relative indices of refraction and therefore the optical path lengths of the waveguide arms. Modulation of the optical input signal occurs due to the fact that the relative phase of the optical signals in the arms varies according to the instantaneous amplitude and direction of the time varying electrical signal driving the electrodes.

Therefore, when the two waveguides are combined at the second Y-junction 128, phase differences of 0 degrees or 180 degrees produce constructive or destructive interference, respectively, thereby leading to amplitude modulated light. The various electrical inputs, Bias and RF, apply their respective electric fields to the same waveguides.

Figure 4:
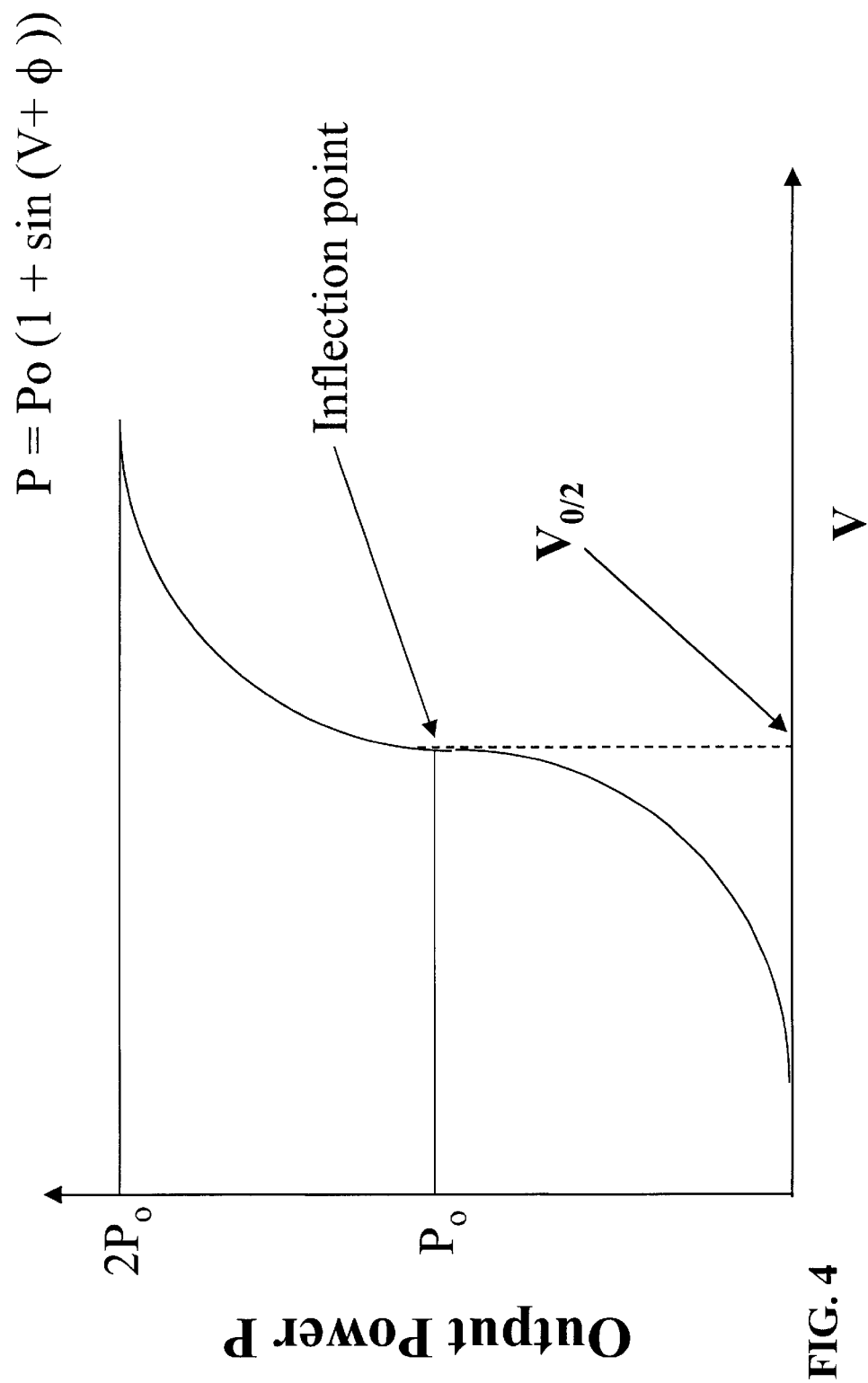
FIG. 4 is a graphical illustration of the transfer function a the Mach-Zehnder modulator of FIG. 3, in accordance with an exemplary embodiment of the present invention.

Referring to FIG. 4, since the Mach-Zehnder modulator operates on light interference or phase interferometry principles, its amplitude transfer function is extremely non-linear. In fact the output optical power is a function of the cosine of the input electrical voltage and is symmetric about its point of inflection (half power point). Therefore, to avoid generating even order distortions in the output signal of the modulator, a DC voltage bias signal is applied to the modulator to maintain the operating point about the half-power point of the modulator. The half-power point is the point on the transfer function sine curve where the slope (i.e., optical throughput/voltage) is a maximum. The maximum in the slope corresponds to a 90 degree relative phase shift between the two arms of the modulator.

In FIG. 4, the optical output power of the Mach-Zehnder modulator is plotted on the vertical axis and the input bias voltage is plotted on the horizontal axis. For purposes of illustration, the half power point is illustrated as V0/2. In operation the modulator may in fact be biased at any odd multiple of V0/2 or −V0/2 for proper operation. For purposes of illustration, an exemplary embodiment of a bias control system has been demonstrated with an Mach-Zehnder modulator external modulator. However, one of ordinary skill in the art will appreciate that the described bias control system may be used with any external electro-optic modulator. Therefore the description of an exemplary bias control system in the context of a Mach-Zehnder modulator external modulator is by way of example only and not by way of limitation.

Figures 5, 5A:
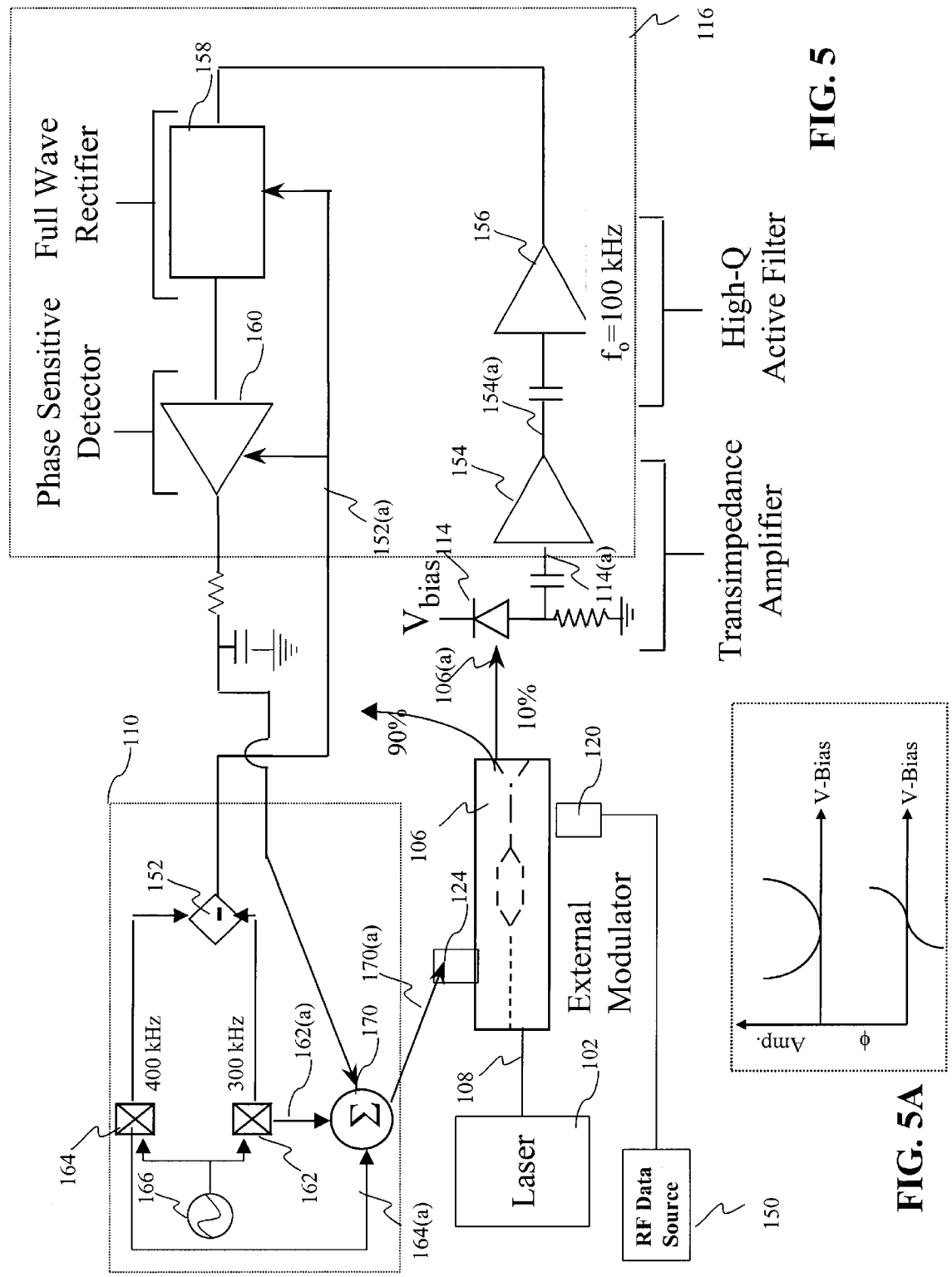
FIG. 5 is a simplified block diagram of an optical communication system having a pilot tone generator for generating pilot tones in bias feedback control system for an electro-optic modulator in accordance with an exemplary embodiment of the present invention.
FIG. 5A is a graphical illustration of the amplitude and phase transfer function of the modulator bias signal in accordance with an exemplary embodiment of the present invention.

Referring to FIG. 5, the RF input port 120 of the electro optic modulator 106 receives a data carrying (e.g., an RF signal) input signal from an RF signal source 150. The received RF input signal is applied to RF electrodes (not shown) that modulate the optical signal as a function of the voltage signal value across the electrodes as previously described. The pilot tone generator 110 generates two pilot tones at different frequencies $f_1$ and $f_2$ that are combined with a bias error signal and then applied to the electro-optic modulator. The frequencies of the pilot tones are preferably in the range of 100 kHz–5 MHz. For illustration purposes in the described exemplary embodiment $f_1$ is assumed to equal 400 kHz and $f_2$ is assumed equal to 300 kHz. In addition, a difference frequency generator 152, takes the difference between frequencies $f_1$ and $f_2$ and generates a reference signal 152(a) at that difference frequency that is forwarded to feedback bias controller circuit.

The system 100 may also include a beam splitter or coupler 112 that taps a small portion 106(a) of the optical output from Electro-optic modulator 106, preferably in the range of about 5–10%, with the remainder of the optical output coupled to an optical fiber or other suitable transmission medium. In an exemplary embodiment of the present invention the tapped signal 106(a) is coupled to an optical detector in the form of a photodiode 114 that produces a feedback signal 114(a) that may be AC coupled with a capacitor. The feedback signal is proportional to the intensity of the tapped optical output signal 106(a).

The feedback signal 114(a) may be input to an amplifier 154 that provides a signal to a high-Q active filter 156. The amplified signal 154(a) contains all the RF carriers of the information signal, the pilot tones, as well as the intermodulation product of the pilot tones that represents the bias point error. Therefore, the high-Q filter 156 selects the intermodulation product that represents the bias point error by first filtering the unwanted signal components.

In an exemplary embodiment of the present invention, the frequencies of the pilot tones $f_1$ and $f_2$ are chosen to be relatively close together, so that the difference frequency may be more readily detected without corruption from the larger amplitude fundamental pilot tones. For illustration purposes $f_1$ may be equal to 400 kHz and $f_2$ may be equal to 300 kHz so that the difference frequency is $(f_1-f_2)=400-300=100$ kHz which is used as the center frequency of high-Q filter 156.

At this point, only the intermodulation product remains. However, the amplitude of the signal alone is insufficient to determine the bias error since the operating point may be above or below the inflection point. However, in operation the intermodulation product undergoes a 180 degree phase shift as the amplitude passes through the inflection point (see FIG. 5A). This phase shift may be used to establish a phase sensitive detection.

In the described exemplary embodiment a full wave rectifier 158 synchronously rectifies the intermodulation signal 156(a) with respect to the reference tone 152(a) at the same frequency output by difference operator 152. (This operation is analogous to a commercially available lock-in amplifier.) In this way, the full wave rectifier and a phase sensitive detector 160 produce a bipolar error output that may be used to uniquely determine the bias error and then suitably correct for it using any of a variety of standard techniques. For example, if the feedback circuit is based on proportional control, the error signal would be proportional to both the polarity and amplitude of the bipolar error signal.

In an exemplary embodiment of the present invention, the pilot tone generator 110 may include two pilot tone reference oscillators 162 and 164 operating at different frequencies $f_1$ and $f_2$. A third oscillator 166 generates a sweep signal 166(a) that is input into a frequency sweep input of oscillators 162 and 164 as is known in the art. One of skill in the art will appreciate that oscillators 162 and 164 may be voltage controlled oscillators or other signal generators as known in the art. The extent of frequency sweep is preferably in the range of 10 kHz–500 kHz, with a sweep rate preferably in the range of 1 kHz–100 kHz.

The common reference sweep signal 166(a) drives oscillators 162 and 164 to maintain a constant difference between the frequency of $f_1$ and $f_2$ and to ensure the phase of $f_1$ and $f_2$ is constant relative to the reference oscillator 166. A combiner 170 combines the dual pilot tones 162(a) and 164(a) along with error bias signal output by phase sensitive detector 160. The combined signal 170(a) is then injected into the modulator bias input port 124. The pilot tones and bias error signal are combined since most standard Mach-Zehnder modulators 106 include only two electrodes, one for the bias signal and one for the actual information signal. Hence, the two pilot tones are combined with the bias signal and applied to the bias electrode.

However, this is not a limitation of the invention. For example, the two pilot tones could have been combined with the information signal and input to the Mach-Zehnder modulator via the RF information signal port 120. Alternately, a Mach-Zehnder modulator or other electro-optic modulator with three electrodes may be used with the present invention, wherein the bias signal, two pilot tones, and information signal are applied to different electrodes.

Figure 6:
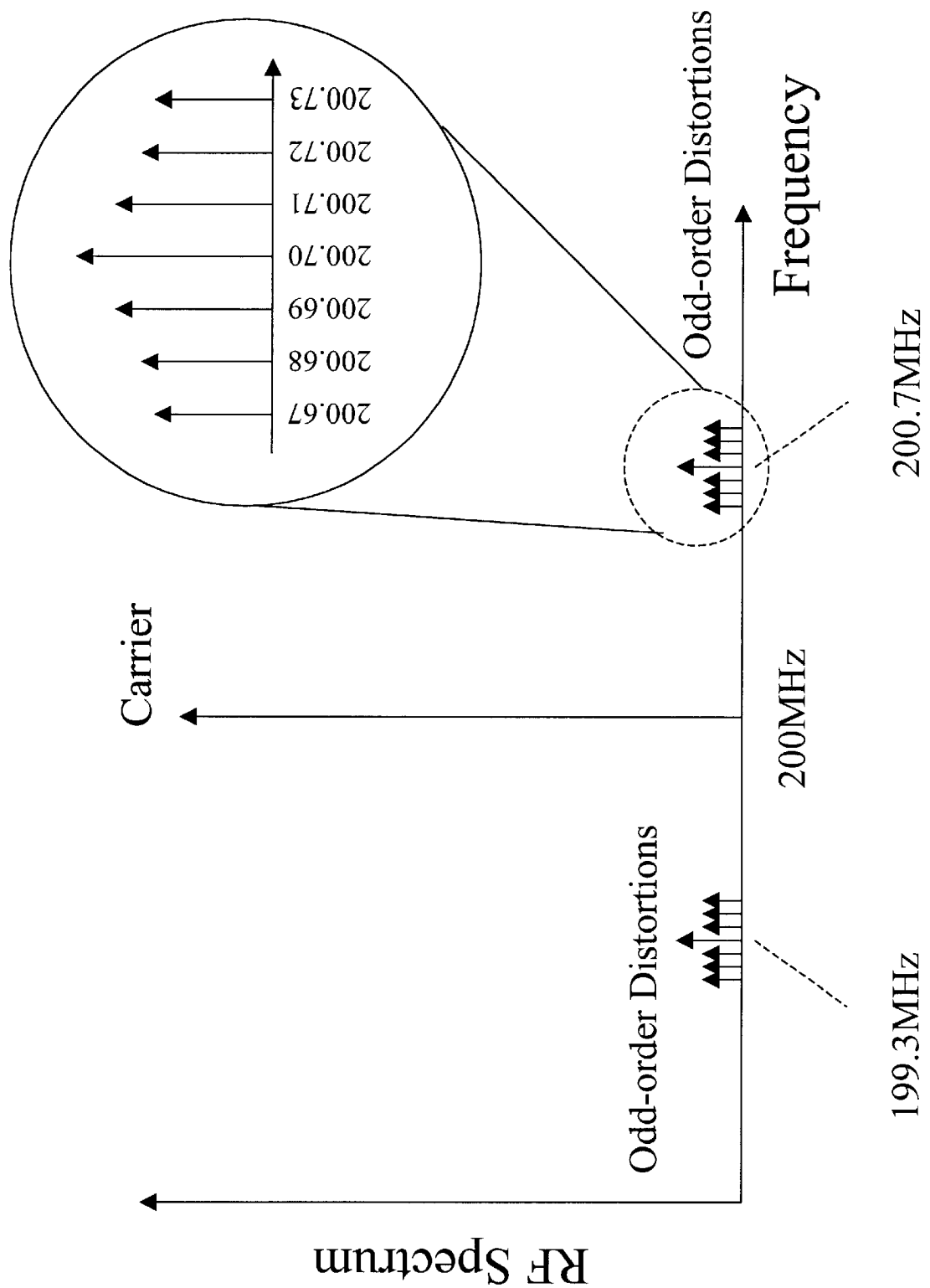
FIG. 6 is a graphical illustration of the frequency spectrum of pilot tones generated by the pilot tone generator of FIG. 5, wherein the pilot tones are spectrally broadened signal to reduce the amplitude of third order distortion products adjacent to the RF carriers.

The described exemplary modulator bias control system allows for the use of fixed frequency demodulators and filters. In this embodiment, the difference between the frequency of the first pilot tone and the frequency of the second pilot tone is held constant over the entire range of excursion frequencies. Advantageously the frequency modulated spectrum of the pilot tones 132(*a*) and 134(*a*) present a lower amplitude spectrally broadened signal for third order distortion products adjacent to the RF carriers. For purposes of illustration we consider a carrier frequency $f_c$=200 MHz, $f_1$=400 kHz, $f_2$=300 kHz, where $f_1$ and $f_2$ are swept over +/−50 kHz each at a rate of 10 kHz by oscillator 136. This corresponds to an FM index of 5 and yields a distortion spectrum shown in FIG. 6. The net effect is that the "integrated distortion power" is present, however, it is spectrally spread over a larger frequency band. Therefore, the amplitude of the pilot tones may be increased thereby increasing the gain of the loop.

Although a preferred embodiment of the present invention has been described, it should not be construed to limit the scope of the appended claims. This invention is not to be limited to the specific arrangements and constructions shown and described. Rather the present invention may be utilized with all bias control feedback systems for external Electro-optic modulator systems. Those skilled in the art will understand that various modifications may be made to the described embodiment.

Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A bias control circuit for automatically controlling a bias point of an electro-optic modulator, comprising:
    a pilot tone generator for generating a first pilot tone at a first frequency and a second pilot tone at a second frequency, wherein frequency of said first and second tones are swept in frequency over a predetermined range with a predetermined sweep rate;
    an optical detector for sampling optical output of the electro-optic modulator, wherein the sampled optical output includes a distortion product resulting from said first and second pilot tones; and
    a feedback controller coupled to the optical detector and to the pilot tone generator for generating an error signal based on said distortion product in the sampled optical output for controlling bias point of the electro-optic modulator.

2. The bias control circuit of claim 1 wherein difference between first frequency of said first tone and second frequency of said second tone is constant over entire frequency sweep.

3. The bias control circuit of claim 2 wherein said pilot tone generator comprises a first oscillator for generating said first pilot tone and a second oscillator for generating said second tone.

4. The bias control circuit of claim 3 wherein said first and second oscillators comprise voltage controlled oscillators.

5. The bias control circuit of claim 3 further comprising an oscillator that generates a sweep signal at a third frequency that drive said first and second oscillators for generating said first and second tones over said predetermined frequency range at said predetermined sweep rate.

6. The bias control circuit of claim 3 wherein said optical detector is a photodiode.

7. The bias control circuit of claim 1 wherein said feedback bias controller comprises a filter for selecting said distortion product.

8. A method of automatically controlling a bias point of an electro-optic modulator, comprising:
    generating a first pilot tone at a first frequency;
    generating a second pilot tone at a second frequency;
    sweeping frequency of said first and second pilot tones over a predetermined frequency range at a predetermined sweep rate;
    detecting a distortion product in output of said modulator resulting from said first and second pilot tones;
    generating an error signal as a function of said distortion product for controlling bias point of the electro-optic modulator.

9. The method of claim 8 wherein the step of sweeping said first and second tones further comprises maintaining a constant difference between the first frequency of the first tone and the second frequency of the second tone.

10. The method of claim 8 wherein the step of generating an error signal as a function of said distortion product comprises filtering output of said modulator to select said distortion product and generating a bipolar error signal that may be used to uniquely determine bias error.

* * * * *